US011200058B2

(12) United States Patent
Venkumahanti et al.

(10) Patent No.: US 11,200,058 B2
(45) Date of Patent: Dec. 14, 2021

(54) DYNAMIC LOAD BALANCING OF HARDWARE THREADS IN CLUSTERED PROCESSOR CORES USING SHARED HARDWARE RESOURCES, AND RELATED CIRCUITS, METHODS, AND COMPUTER-READABLE MEDIA (71) Applicant: QUALCOMM Incorporated, San Diego, CA (US)

(72) Inventors: Suresh Kumar Venkumahanti, Austin, TX (US); Stephen Robert Shannon, Austin, TX (US); Lin Wang, Austin, TX (US)

(73) Assignee: Qualcomm Incorporated

( * ) Notice: Subject to any disclaimer, the term of this patent is extended or adjusted under 35 U.S.C. 154(b) by 533 days.

(21) Appl. No.: 14/271,812

(22) Filed: May 7, 2014

(65) Prior Publication Data
US 2015/0324239 A1 Nov. 12, 2015

(51) Int. Cl.
G06F 9/30 (2018.01)
G06F 9/38 (2018.01)
G06F 9/50 (2006.01)

(52) U.S. Cl.
CPC ........ *G06F 9/30098* (2013.01); *G06F 9/3851* (2013.01); *G06F 9/3891* (2013.01); *G06F 9/5088* (2013.01)

(58) Field of Classification Search
CPC .. G06F 9/30098; G06F 9/3851; G06F 9/3891; G06F 9/5088

(Continued)

(56) References Cited

U.S. PATENT DOCUMENTS 5,692,192 A 11/1997 Sudo
8,413,158 B2 4/2013 Chiang et al.
(Continued)

FOREIGN PATENT DOCUMENTS

CN 101446910 A 6/2009
CN 101788922 A 7/2010
(Continued)

OTHER PUBLICATIONS

Garg, R., et al., "Cache Design Options for a Clustered Multithreaded Architecture," Technical Report #866—The University of Rochester, Copyright: 2005, 21 pages.
(Continued)

*Primary Examiner* — Chat C Do
*Assistant Examiner* — Bradford F Wheaton
(74) *Attorney, Agent, or Firm* — Withrow & Terranova, PLLC (57) ABSTRACT

Dynamic load balancing of hardware threads in clustered processor cores using shared hardware resources, and related circuits, methods, and computer readable media are disclosed. In one aspect, a dynamic load balancing circuit comprising a control unit is provided. The control unit is configured to determine whether a suboptimal load condition exists between a first cluster and a second cluster of a clustered processor core. If a suboptimal load condition exists, the control unit is further configured to transfer a content of private register(s) of a first hardware thread of the first cluster to private register(s) of a second hardware thread of the second cluster via shared hardware resources of the first hardware thread and the second hardware thread. The control unit is also configured to exchange a first identifier associated with the first hardware thread with a second identifier associated with the second hardware thread via the shared hardware resources.

24 Claims, 6 Drawing Sheets (58) Field of Classification Search
USPC .......................................................... 718/104
See application file for complete search history.

(56) References Cited

U.S. PATENT DOCUMENTS

| | | | |
|---|---|---|---|
| 2009/0292892 A1* | 11/2009 | Abernathy | G06F 1/3203 |
| | | | 711/163 |
| 2010/0146513 A1* | 6/2010 | Song | G06F 1/3203 |
| | | | 718/104 |
| 2010/0186015 A1* | 7/2010 | Wang | G06F 9/467 |
| | | | 718/101 |
| 2010/0262870 A1* | 10/2010 | Davies | G06F 11/3017 |
| | | | 714/47.1 |
| 2011/0055838 A1 | 3/2011 | Moyes | |
| 2011/0126200 A1* | 5/2011 | Krieger | G06F 9/5033 |
| | | | 718/102 |
| 2011/0191776 A1 | 8/2011 | Bose et al. | |
| 2011/0219246 A1 | 9/2011 | Arai | |
| 2013/0061237 A1* | 3/2013 | Zaarur | G06F 9/4856 |
| | | | 718/105 |
| 2013/0160026 A1 | 6/2013 | Kuesel et al. | |
| 2013/0283277 A1 | 10/2013 | Cai et al. | |
| 2013/0332778 A1 | 12/2013 | Spracklen | |
| 2014/0109098 A1* | 4/2014 | Sato | G06F 9/3836 |
| | | | 718/102 |
| 2014/0173623 A1* | 6/2014 | Chang | G06F 9/5088 |
| | | | 718/105 |

FOREIGN PATENT DOCUMENTS

| | | |
|---|---|---|
| CN | 103399796 A | 11/2013 |
| CN | 103617088 A | 3/2014 |
| EP | 1582980 A1 | 10/2005 |
| JP | 2006139495 A | 6/2006 |
| KR | 20090061177 A | 6/2009 |

OTHER PUBLICATIONS

International Search Report and Written Opinion for PCT/US2015/026634, dated Jul. 3, 2015, 9 pages.
Second Written Opinion for PCT/US2015/026634, dated Apr. 18, 2016, 5 pages.
International Preliminary Report on Patentability for PCT/US2015/026634, dated Jul. 19, 2016, 21 pages.
Search Report for Japanese Patent Application No. 2016564591, dated Jan. 23, 2019, 44 pages.
Notice of Reasons for Refusal for Japanese Patent Application No. 2016564591, dated Feb. 25, 2019, 6 pages.

* cited by examiner

DYNAMIC LOAD BALANCING OF HARDWARE THREADS IN CLUSTERED PROCESSOR CORES USING SHARED HARDWARE RESOURCES, AND RELATED CIRCUITS, METHODS, AND COMPUTER-READABLE MEDIA

BACKGROUND

I. Field of the Disclosure

The technology of the disclosure relates generally to improving performance of clustered processor cores.

II. Background

Modern processors, such as central processing units (CPUs), may include one or more hardware threads providing resources for executing computer instructions. Each hardware thread may include a set of private registers (such as General Purpose Registers (GPRs), control registers, or program counters, as non-limiting examples) that are accessible only by the hardware thread. The private registers may be used by the hardware thread to host a software thread for execution. The contents of the private registers may together represent a "context" for the software thread that defines its state at a given point in time as it is executed by the hardware thread.

Within a processor, hardware threads may be organized into groups known as "clusters." Each cluster may include one or more hardware threads, and may also include shared cluster resources that can be accessed by any hardware thread within the cluster. For example, shared cluster resources may include an execution pipeline that each of the hardware threads of the cluster may use on a rotating basis. Multiple clusters may be further organized into "clustered processor cores." Each clustered processor core may include shared hardware resources that may be utilized by the multiple clusters. The shared hardware resources may include one or more execution units (such as floating point units and/or arithmetic logic units) and/or caches (e.g., data caches), as non-limiting examples.

In some circumstances, a first cluster of a clustered processor core may experience a suboptimal load condition relative to a second cluster. For example, all hardware threads of the first cluster may be executing software threads and operating under high load conditions, while the hardware threads within the second cluster may be underutilized. The suboptimal load condition may also occur if the first and second clusters are each executing a hardware thread in circumstances during which power savings could be realized if a single cluster were executing both hardware threads.

The existence of a suboptimal load condition may result in the clustered processor core operating at a sub-optimal performance level. Conventional software-based techniques enable a software thread to be shifted from one hardware thread to another. The shifting process conventionally requires an operating system to save the context of the software thread to memory, and then reload the software thread into a different hardware thread. However, this process may be not be feasible if the operating system lacks access to micro-architectural data needed to determine performance and/or power consumption benefits of shifting the software thread. Moreover, saving the context of the software thread to memory may be prohibitively slow.

SUMMARY OF THE DISCLOSURE

Aspects disclosed in the detailed description include dynamic load balancing of hardware threads in clustered processor cores using shared hardware resources. Related circuits, methods, and computer-readable media are also disclosed. In this regard in one aspect, a dynamic load balancing circuit for providing dynamic load balancing of hardware threads in clustered processor cores is provided. The dynamic load balancing circuit comprises a control unit that is communicatively coupled to a first cluster and a second cluster of a clustered processor core. The control unit is configured to determine whether a suboptimal load condition exists between the first cluster and the second cluster. Responsive to determining that the suboptimal load condition exists, the control unit is further configured to transfer a content of one or more private registers of a first hardware thread of the first cluster to one or more private registers of a second hardware thread of the second cluster via shared hardware resources communicatively coupled to the first hardware thread and the second hardware thread. Further responsive to determining that the suboptimal load condition exists, the control unit is also configured to exchange a first identifier associated with the first hardware thread with a second identifier associated with the second hardware thread via the shared hardware resources. In this manner, the suboptimal load condition may be efficiently resolved by relocating contents of the first hardware thread from the first cluster to the second cluster via the shared hardware resources.

In another aspect, a dynamic load balancing circuit for providing dynamic load balancing of hardware threads in clustered processor cores is provided. The dynamic load balancing circuit comprises a means for determining whether a suboptimal load condition exists between a first cluster and a second cluster of a clustered processor core. The dynamic load balancing circuit further comprises a means for, responsive to determining that the suboptimal load condition exists, transferring a content of one or more private registers of a first hardware thread of the first cluster to one or more private registers of a second hardware thread of the second cluster via shared hardware resources communicatively coupled to the first hardware thread and the second hardware thread. The dynamic load balancing circuit also comprises a means for, responsive to determining that the suboptimal load condition exists, exchanging a first identifier associated with the first hardware thread with a second identifier associated with the second hardware thread via the shared hardware resources.

In another aspect, a method for providing dynamic load balancing of hardware threads in clustered processor cores is provided. The method comprises determining whether a suboptimal load condition exists between a first cluster and a second cluster of a clustered processor core. The method further comprises, responsive to determining that the suboptimal load condition exists, transferring a content of one or more private registers of a first hardware thread of the first cluster to one or more private registers of a second hardware thread of the second cluster via shared hardware resources communicatively coupled to the first hardware thread and the second hardware thread. The method also comprises, responsive to determining that the suboptimal load condition exists, exchanging a first identifier associated with the first hardware thread with a second identifier associated with the second hardware thread via the shared hardware resources.

In another aspect, a non-transitory computer-readable medium is provided, having stored thereon computer executable instructions to cause a processor to determine whether a suboptimal load condition exists between a first cluster and a second cluster of a clustered processor core. The computer executable instructions further cause the processor to, responsive to determining that the suboptimal load condition exists, transfer a content of one or more private registers of a first hardware thread of the first cluster to one or more private registers of a second hardware thread of the second cluster via shared hardware resources communicatively coupled to the first hardware thread and the second hardware thread. The computer executable instructions also cause the processor to, responsive to determining that the suboptimal load condition exists, exchange a first identifier associated with the first hardware thread with a second identifier associated with the second hardware thread via the shared hardware resources.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include dynamic load balancing of hardware threads in clustered processor cores using shared hardware resources. Related circuits, methods, and computer-readable media are also disclosed. In this regard in one aspect, a dynamic load balancing circuit for providing dynamic load balancing of hardware threads in clustered processor cores is provided. The dynamic load balancing circuit comprises a control unit that is communicatively coupled to a first cluster and a second cluster of a clustered processor core. The control unit is configured to determine whether a suboptimal load condition exists between the first cluster and the second cluster. Responsive to determining that the suboptimal load condition exists, the control unit is further configured to transfer a content of one or more private registers of a first hardware thread of the first cluster to one or more private registers of a second hardware thread of the second cluster via shared hardware resources communicatively coupled to the first hardware thread and the second hardware thread. Further responsive to determining that the suboptimal load condition exists, the control unit is also configured to exchange a first identifier associated with the first hardware thread with a second identifier associated with the second hardware thread via the shared hardware resources. In this manner, the suboptimal load condition may be efficiently resolved by relocating contents of the first hardware thread from the first cluster to the second cluster via the shared hardware resources.

Figure 1:
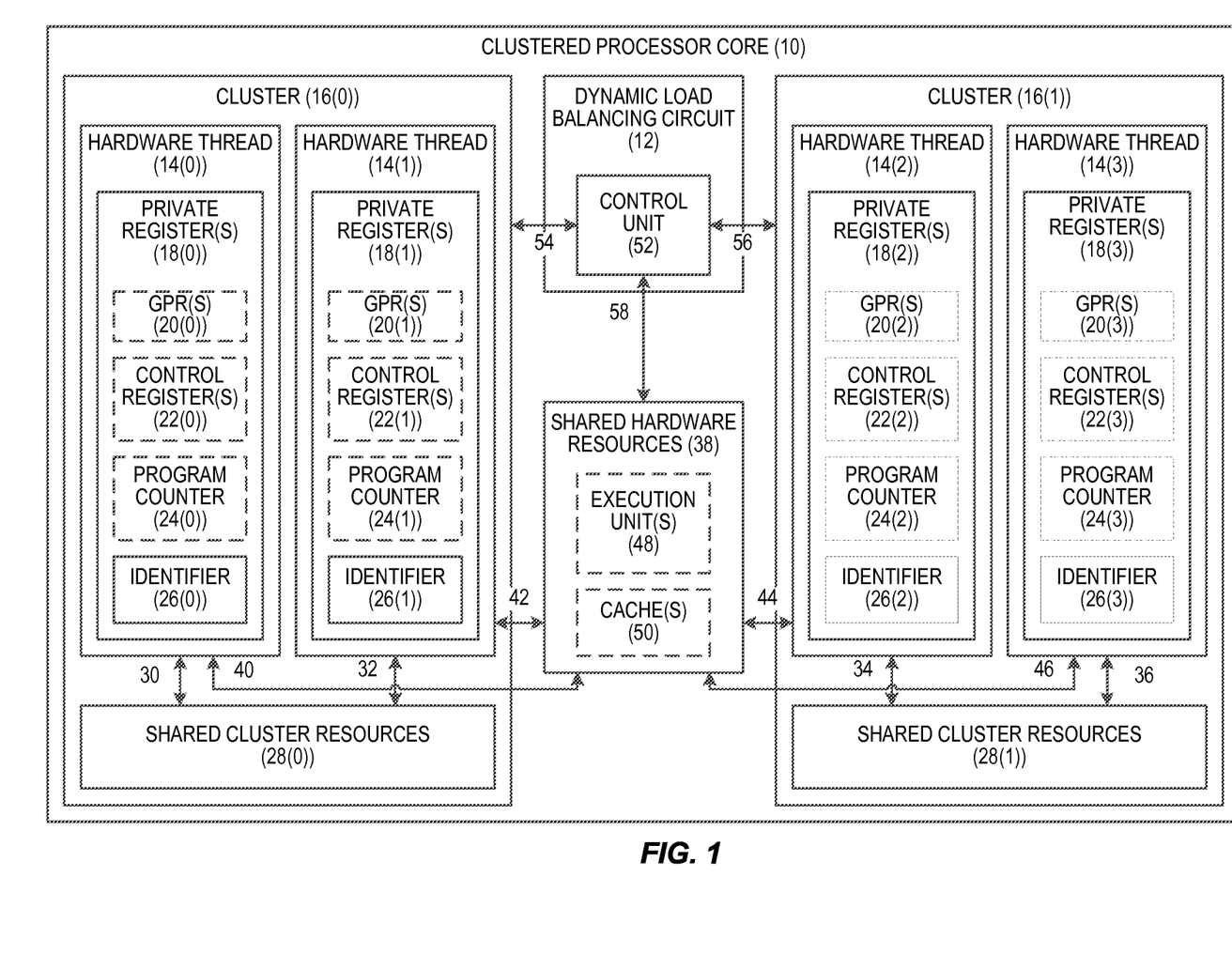
FIG. 1 is a block diagram of an exemplary clustered processor core that includes a dynamic load balancing circuit that is configured to perform load balancing of hardware threads using shared hardware resources.

In this regard, FIG. 1 is a block diagram of an exemplary clustered processor core 10. The clustered processor core 10 includes a dynamic load balancing circuit 12 providing load balancing among hardware threads within clusters of the clustered processor core 10, as disclosed herein. The clustered processor core 10 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

In the example of FIG. 1, the clustered processor core 10 includes hardware threads 14(0)-14(3), each of which is operable to host a software thread (not shown). The hardware threads 14(0)-14(3) are organized into clusters, with a cluster 16(0) including the hardware threads 14(0) and 14(1), and a cluster 16(1) including the hardware threads 14(2) and 14(3). It is to be understood that the aspect shown in FIG. 1 is for illustration purposes only. Accordingly, some aspects may include more or fewer hardware threads 14 within each cluster 16 than illustrated in FIG. 1. Likewise, it is to be further understood that some aspects may include more clusters 16 within the clustered processor core 10 than shown in FIG. 1.

The hardware thread 14(0) includes private register(s) 18(0) that are accessible only by the hardware thread 14(0). In some aspects, the private register(s) 18(0) may include respective General Purpose Register(s) (GPR(s)) 20(0), control register(s) 22(0), and/or a program counter 24(0), as non-limiting examples. The contents (not shown) of the private register(s) 18(0) may represent a "context" for a software thread (not shown) hosted by the hardware thread 14(0), defining the software thread's state at a given point in time as it is executed. The hardware threads 14(1)-14(3) likewise include private register(s) 18(1)-18(3), respectively, having functionality corresponding to the private register(s) 18(0) of the hardware thread 14(0). Some aspects may provide that the private register(s) 18(1)-18(3) include respective GPR(s) 20(1)-20(3), control register(s) 22(1)-22(3), and/or program counters 24(1)-24(3), as non-limiting examples.

Each of the hardware threads 14(0)-14(3) of FIG. 1 also includes an identifier 26(0)-26(3), respectively. Each identifier 26(0)-26(3) contains a modifiable identification that may be used by software, such as an operating system, to identify the corresponding hardware threads 14(0)-14(3). In some aspects, one or more of the identifiers 26 may be implemented as one of the control register(s) 22. As described in greater detail below, the identifiers 26 enable the dynamic load balancing circuit 12 to relocate a hardware thread 14 from one cluster 16 to another in a manner that is transparent to software.

As seen in FIG. 1, the clusters 16(0) and 16(1) provide shared cluster resources 28(0) and 28(1), respectively, that may accessed and shared by the hardware threads 14 within each cluster 16. In the cluster 16(0), the hardware thread 14(0) is communicatively coupled to the shared cluster resources 28(0) by a bus 30, while the hardware thread 14(1) is communicatively coupled to the shared cluster resources 28(0) by a bus 32. Similarly, the hardware thread 14(2) in the cluster 16(1) is communicatively coupled to the shared cluster resources 28(1) by a bus 34, while the hardware thread 14(3) is communicatively coupled to the shared cluster resources 28(1) by a bus 36. Each of the shared cluster resources 28(0) and 28(1) may include, as non-limiting examples, an execution pipeline (not shown) that may be shared on a rotating basis by the hardware threads 14 to execute software threads. For instance, access to an execution pipeline of the shared cluster resources 28(0) may be alternately allocated to each of the hardware threads 14(0) and 14(1) as part of preemptive multitasking operations provided by the cluster 16(0).

The clustered processor core 10 of FIG. 1 also provides shared hardware resources 38 that are accessible to each of the hardware threads 14 of the clusters 16. As shown in FIG. 1, the hardware thread 14(0) is communicatively coupled to the shared hardware resources 38 by a bus 40, while the hardware thread 14(1) is communicatively coupled to the shared hardware resources 38 by a bus 42. Likewise, the hardware thread 14(2) is communicatively coupled to the shared hardware resources 38 by a bus 44, while the hardware thread 14(3) is communicatively coupled to the shared hardware resources 38 by a bus 46. In some aspects, the shared hardware resources 38 may include one or more execution units 48, such as a floating point unit and/or an arithmetic logic unit, as non-limiting examples. The shared hardware resources 38 may also include one or more caches 50, such as a data cache, as a non-limiting example.

The hardware threads 14 of the clusters 16 enable the clustered processor core 10 of FIG. 1 to effectively execute up to four software threads concurrently. During execution of the software threads, circumstances may arise in which, for example, the cluster 16(0) experiences a suboptimal load condition relative to the cluster 16(1). For instance, the hardware threads 14(0) and 14(1) of the cluster 16(0) may be operating under high load conditions, while the hardware threads 14(2) and 14(3) of the cluster 16(1) may be underutilized (due to, for example, being unused or being stalled due to a cache miss or other delay condition). For aspects in which reducing power consumption is a priority of the clustered processor core 10, the suboptimal load condition may occur when the clusters 16(0) and 16(1) are each executing a single hardware thread 14 in circumstances where power savings could be realized if a single cluster 16 were executing both hardware threads 14.

Accordingly, the dynamic load balancing circuit 12 is provided to enable dynamic load balancing between the hardware threads 14 in a more efficient manner than software-based solutions. In this regard, the dynamic load balancing circuit 12 includes a control unit 52, which is communicatively coupled to the cluster 16(0) via a bus 54 and communicatively coupled to the cluster 16(1) via a bus 56. In some aspects, load data (not shown) related to load conditions of the clusters 16(0) and 16(1) may be provided to the control unit 52 by the clusters 16(0) and 16(1), and/or may be actively collected by the control unit 52 via the bus 54 and the bus 56. The load data may include, as non-limiting examples, data indicating processor utilization, utilization of shared cluster resources 28(0) and/or 28(1), a number of executing processes, and/or power consumption by the clusters 16(0) and 16(1). By analyzing and comparing the load data, the control unit 52 may monitor load conditions of the hardware threads 14(0) and 14(1) of the cluster 16(0) and the hardware threads 14(2) and 14(3) of the cluster 16(1). The control unit 52 may also be communicatively coupled to the shared hardware resources 38 via a bus 58, in order to facilitate relocation of contents of the hardware threads 14 between the clusters 16 via the shared hardware resources 38. In this manner, the dynamic load balancing circuit 12 may resolve suboptimal load conditions more quickly and efficiently compared to conventional software-based techniques for moving software threads.

Figure 2:
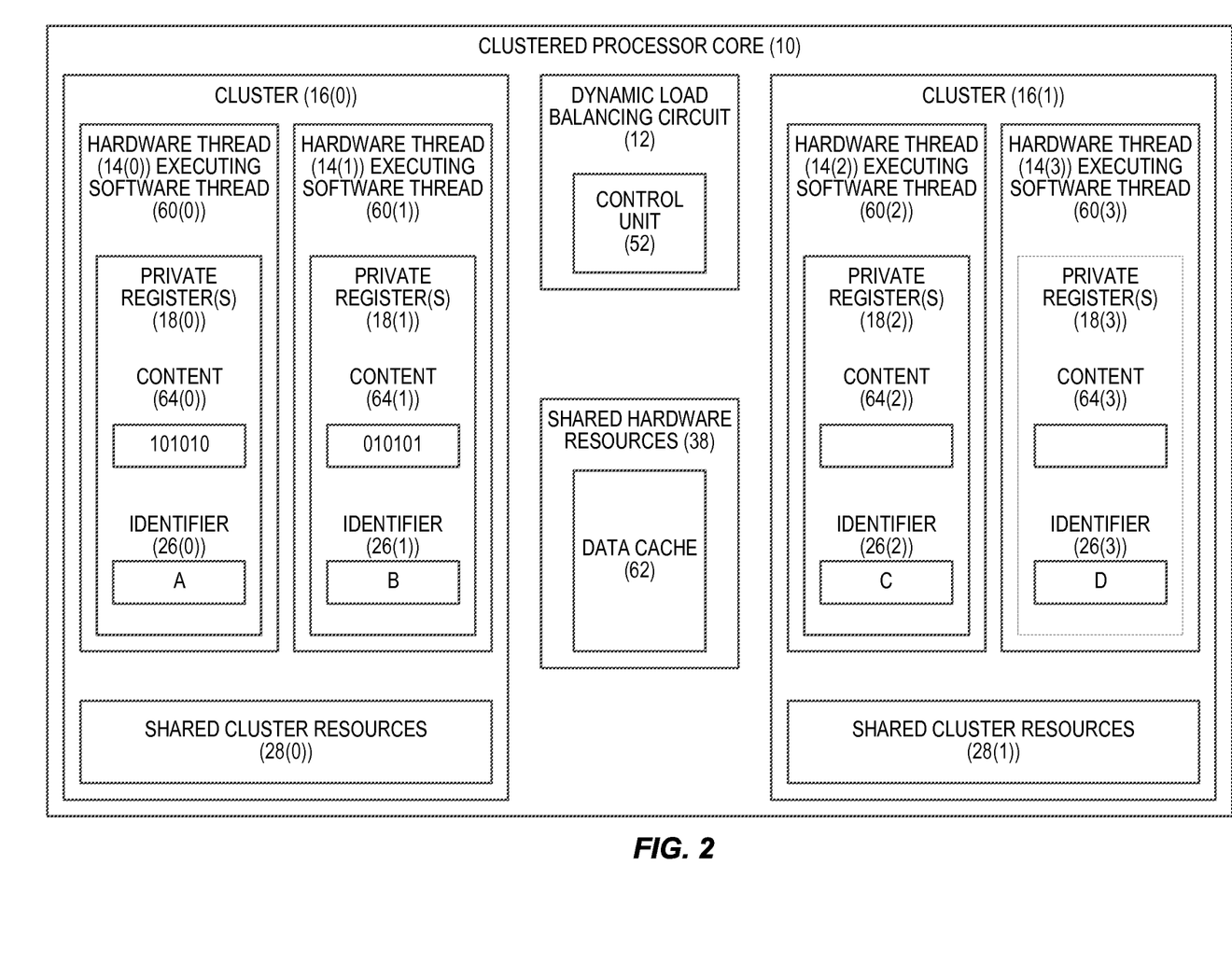
FIG. 2 is a block diagram of the clustered processor core of FIG. 1 illustrating hosting of software threads by hardware threads prior to load balancing by the dynamic load balancing circuit.
Figure 3:
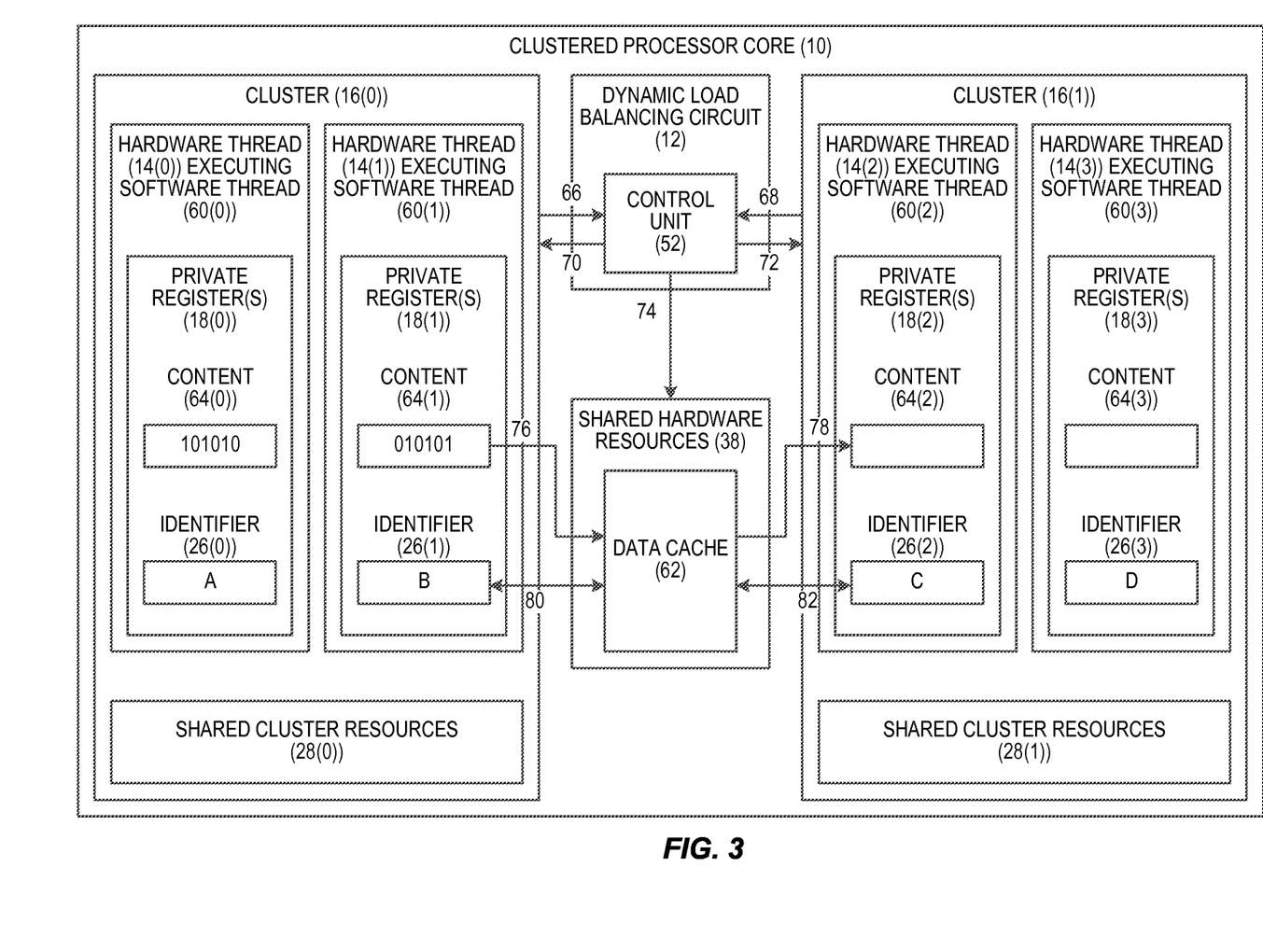
FIG. 3 is a block diagram of the clustered processor core of FIG. 1 illustrating communications flows during load balancing operations of the dynamic load balancing circuit.
Figure 4:
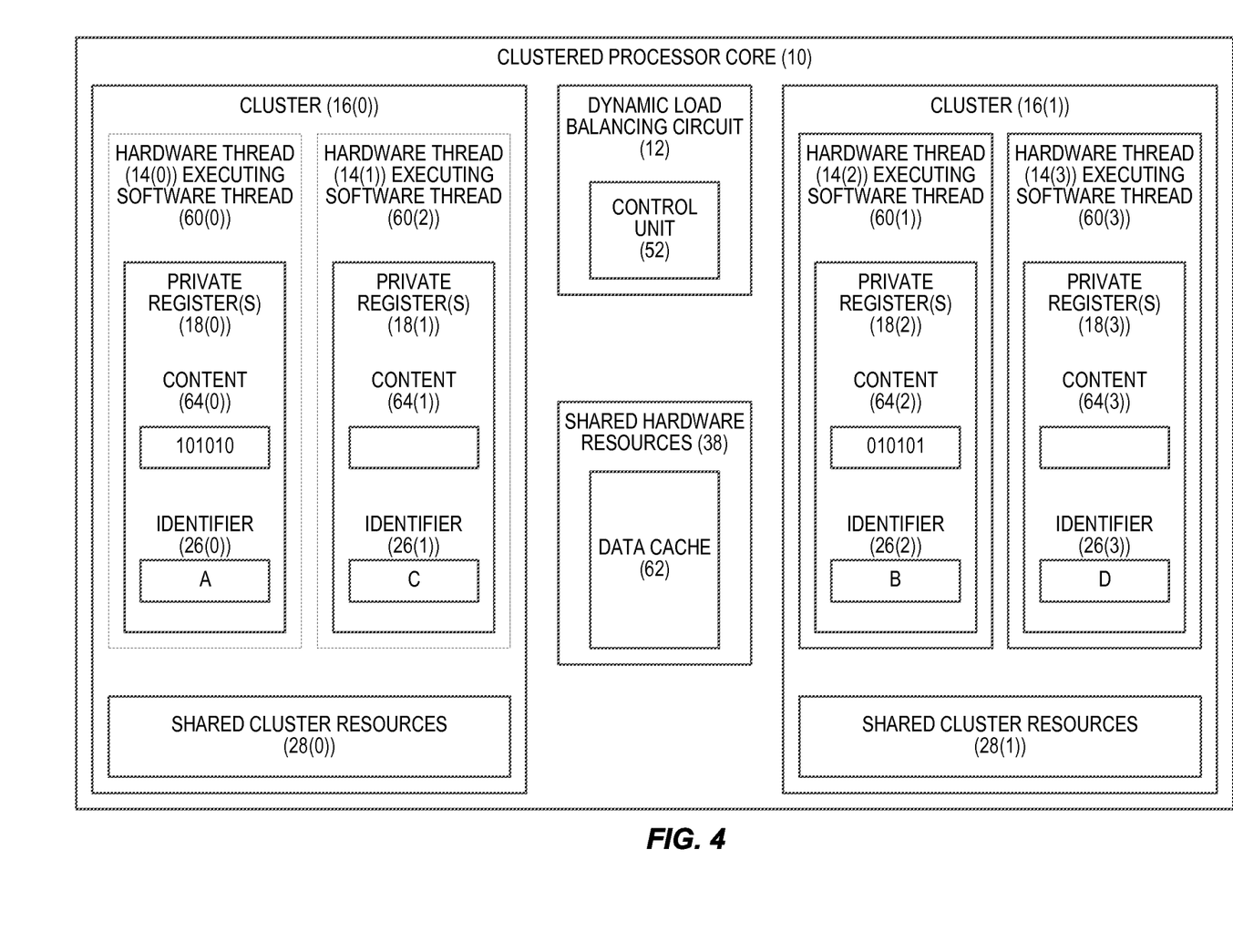
FIG. 4 is a block diagram of the clustered processor core of FIG. 1 illustrating hosting of software threads after load balancing operations are completed by the dynamic load balancing circuit.

To better illustrate the relocation of a hardware thread 14 from one cluster 16 to another by the dynamic load balancing circuit 12 of FIG. 1 as a result of detecting a suboptimal load condition, FIGS. 2-4 are provided. FIG. 2 illustrates the clustered processor core 10 during execution of software threads 60 hosted by the hardware threads 14, giving rise to a suboptimal load condition. FIG. 3 shows communications flows within the clustered processor core 10 as the dynamic load balancing circuit 12 relocates contents of the hardware thread 14(1) from the cluster 16(0) to the cluster 16(1) via the shared hardware resources 38. FIG. 4 illustrates the contents of the hardware threads 14 following the relocation of the contents of the hardware thread 14(1) and resolution of the suboptimal load condition. For the sake of clarity and brevity, elements of FIG. 1 are referenced in describing FIGS. 2-4.

In FIG. 2, the shared hardware resources 38 of the clustered processor core 10 include a data cache 62 that is accessible by all of the hardware threads 14. In the example of FIG. 2, the hardware threads 14(0)-14(3) are hosting software threads 60(0)-60(3), respectively. The hardware threads 14(0)-14(3) are associated with identifiers 26(0)-26(3), respectively, which currently contain respective values "A," "B," "C," and "D." The identifiers 26 serve as an abstraction layer by which software, such as an operating system, may map each of the software threads 60(0)-60(3) to the corresponding hardware threads 14(0)-14(3). The private register(s) 18(0) of the hardware thread 14(0) contains a content 64(0) representing a current context of the software thread 60(0). Likewise, the private register(s) 18(1) of the hardware thread 14(1) contains a content 64(1) representing a current context of the software thread 60(1). For purposes of illustration, the content 64(0) is shown as having bit values "101010," while the content 64(1) is shown as having bit values "010101."

It is to be understood that the software threads 60(0) and 60(1) currently have a thread state (not shown) of "ON," indicating that they are being actively executed on the hardware threads 14(0) and 14(1), respectively, of the cluster 16(0). In contrast, the software threads 60(2) and 60(3) on the hardware threads 14(2) and 14(3) of the cluster 16(1) have a thread state of "OFF," indicating that execution is not presently occurring. For example, one or both of the software threads 60(2) and 60(3) may be stalled as the result of a cache miss or other delay condition.

As a consequence, a suboptimal load condition exists between the cluster 16(0) and the cluster 16(1). The cluster 16(0) is forced to multitask both the software thread 60(0) on the hardware thread 14(0) and the software thread 60(1) on the hardware thread 14(1), resulting in overutilization of the shared cluster resources 28(0). At the same time, the shared cluster resources 28(1) of the cluster 16(1) are underutilized due to the inactive thread status of the software thread 60(2) on the hardware thread 14(2) and the software thread 60(3) on the hardware thread 14(3). This suboptimal load condition between the cluster 16(0) and the cluster 16(1) may result in the clustered processor core 10 operating at a sub-optimal level.

FIG. 3 illustrates the operations taken by the control unit 52 of the dynamic load balancing circuit 12 to resolve the suboptimal load condition between the cluster 16(0) and the cluster 16(1). By monitoring load conditions of the clusters 16(0) and 16(1) (as indicated by arrows 66 and 68, respectively), the control unit 52 may determine that the suboptimal load condition exists between the cluster 16(0) and the cluster 16(1). The control unit 52 may then issue control signals (indicated by arrows 70 and 72) to the clusters 16(0) and/or the clusters 16(1) to effect a relocation of contents of the hardware thread 14(1) from the cluster 16(0) to the cluster 16(1). In some aspects, the control unit 52 may also issue control signals (indicated by arrow 74) to the shared hardware resources 38 to facilitate the relocation.

In the example of FIG. 3, after the suboptimal load condition is determined to exist, the control unit 52 of the dynamic load balancing circuit 12 may direct the hardware thread 14(1) to transfer the content 64(1) of the private register(s) 18(1) to the shared hardware resources 38 (in particular, to the data cache 62). This transfer is represented by arrow 76. The content 64(1) may then be further transferred from the data cache 62 to the private register(s) 18(2) of the hardware thread 14(2) of the cluster 16(1) (indicated by arrow 78). Because the content 64(1) represents the current context of the software thread 60(1), transferring the content 64(1) to the private register(s) 18(2) effectively relocates the software thread 60(1) to the hardware thread 14(2).

To ensure that the relocation of the content 64(1) of the private register(s) 18(1) is transparent to operating system software being executed by the clustered processor core 10, the control unit 52 also swaps the identifiers 26(1) and 26(2) of the hardware threads 14(1) and 14(2), respectively. Accordingly, as seen in FIG. 3, the value in the identifier 26(1) of the hardware thread 14(1) is exchanged for the value in the identifier 26(2) of the hardware thread 14(2) via the data cache 62 (indicated by bidirectional arrows 80 and 82). Because the operating system uses the values of the identifiers 26 to map the software threads 60 to the hardware threads 14, the operating system will remain unaware that the physical resources on which the software threads 60 are executing has changed.

Referring now to FIG. 4, the state of the hardware threads 14 and the software threads 60 after the relocation of the contents of the hardware thread 14(1) are shown. In FIG. 4, the hardware threads 14(0) and 14(3) are associated with the identifiers 26(0) and 26(3), respectively, having respective values "A" and "D" as before. However, the identifier 26(1) associated with the hardware thread 14(1) now has a value of "C," while the identifier 26(2) associated with the hardware thread 14(2) has a value of "B." Additionally, the content 64(2) of the private register(s) 18(2) of the hardware thread 14(2) now contains the values previously stored in the content 64(1) of the private register(s) 18(1) of the hardware thread 14(1). As a result, the software thread 60(1) is now hosted by the hardware thread 14(2), and may continue execution within the cluster 16(1). At this point, each of the clusters 16 contains one software thread 60 having a thread state (not shown) of "ON" (i.e., the software thread 60(0) in the cluster 16(0) and the software thread 60(1) in the cluster 16(1)). Each cluster 16 also contains one software thread 60 having a thread state of "OFF" (i.e., the software thread 60(2) in the cluster 16(0) and the software thread 60(3) in the cluster 16(1)). Accordingly, the processing load resulting from executing the software threads 60 is more evenly balanced between the clusters 16, resulting in improved performance of the clustered processor core 10.

While the examples of FIGS. 2-4 illustrate the dynamic load balancing circuit 12 distributing a processing load more evenly across the clusters 16, some aspects of the clustered processor core 10 may provide that reduction of power consumption is a higher priority than improving processing performance. For example, in some aspects, the dynamic load balancing circuit 12 may detect a potential reduction in energy consumption of the clustered processing core 10 by relocating the contents 64 of two active hardware threads 14 onto the same cluster 16. By doing so, the dynamic load balancing circuit 12 may enable the clustered processor core 10 to shut down one of the clusters 16 to realize power savings.

Figure 5:
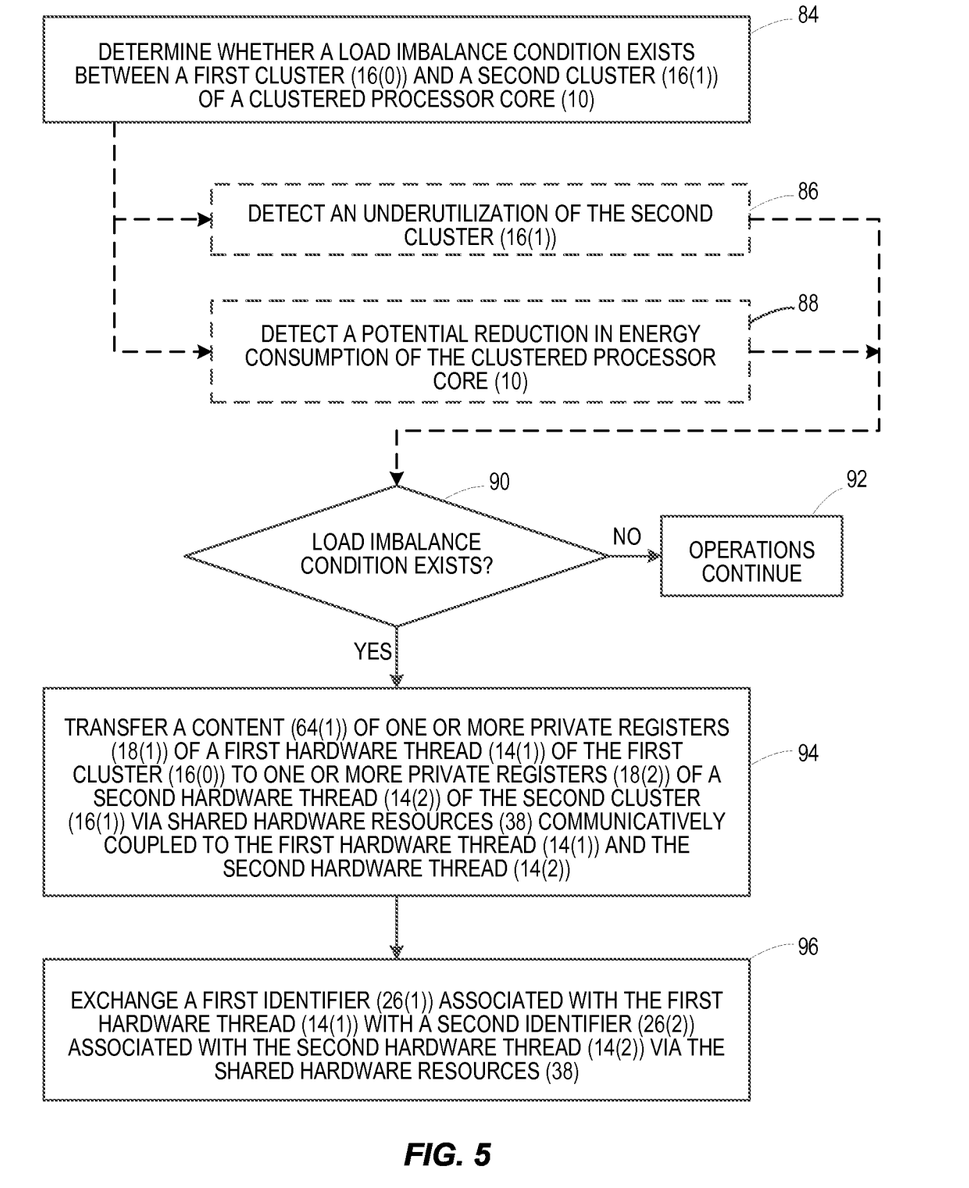
FIG. 5 is a flowchart illustrating an exemplary process for dynamic load balancing of hardware threads in clustered processor cores using shared hardware resources.

To illustrate an exemplary process for dynamic load balancing of hardware threads 14 in clustered processor cores 10 using shared hardware resources 38, FIG. 5 is provided. In describing FIG. 5, elements of FIGS. 1-4 are referenced for the sake of clarity. Operations begin in FIG. 5 with the control unit 52 of the dynamic load balancing circuit 12 determining whether suboptimal load condition exists between a first cluster 16(0) and a second cluster 16(1) of a clustered processor core 10 (block 84). In some aspects, operations of block 84 for determining whether the suboptimal load condition exists may include detecting an underutilization of the second cluster 16(1) (block 86). Some aspects may provide that operations of block 84 for determining whether the suboptimal load condition exists comprises detecting a potential reduction in energy consumption of the clustered processor core 10 (block 88).

The control unit 52 then evaluates, based on its determination, whether a suboptimal load condition exists (block 90). If not, operations of the clustered processor core 10 continue (block 92). However, if it is determined at block 90 that a suboptimal load condition does exist, the control unit 52 transfers a content 64(1) of one or more private registers 18(1) of a first hardware thread 14(1) of the first cluster 16(0) to one or more private registers 18(2) of a second hardware thread 14(2) of the second cluster 16(1) (block 94). The transfer is effected via shared hardware resources 38 communicatively coupled to the first hardware thread 14(1) and the second hardware thread 14(2). The control unit 52 further exchanges a first identifier 26(1) associated with the first hardware thread 14(1) with a second identifier 26(2) associated with the second hardware thread 14(2) via the shared hardware resources 38 (block 96).

The dynamic load balancing circuit 12 according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 6:
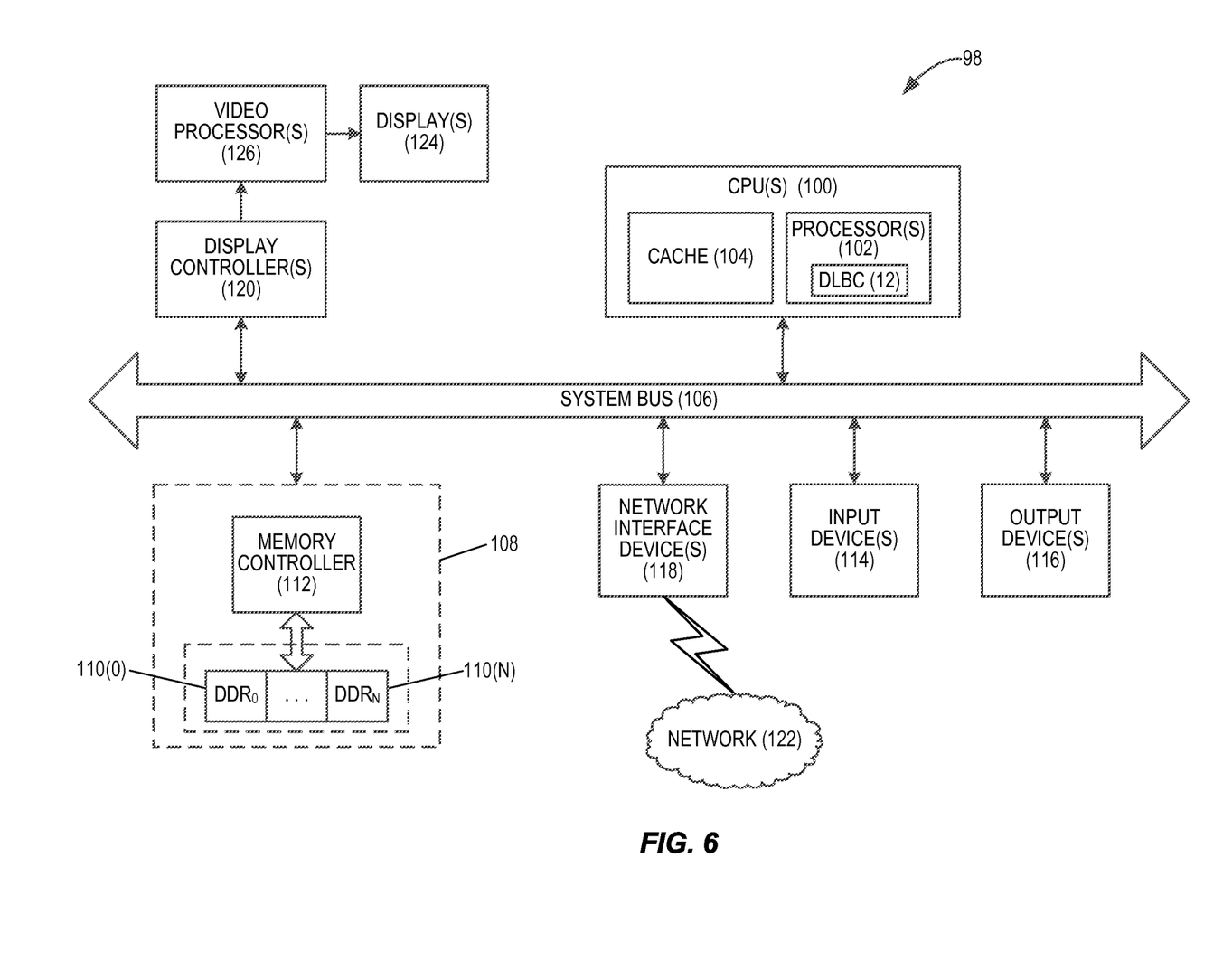
FIG. 6 is a block diagram of an exemplary processor-based system that can include the dynamic load balancing circuit of FIG. 1.

In this regard, FIG. 6 illustrates an example of a processor-based system 98 that can employ the dynamic load balancing circuit 12 illustrated in FIG. 1. In this example, the processor-based system 98 includes one or more central processing units (CPUs) 100, each including one or more processors 102 that may comprise the dynamic load balancing circuit (DLBC) 12 of FIG. 1. The CPU(s) 100 may have cache memory 104 coupled to the processor(s) 102 for rapid access to data or instructions. The CPU(s) 100 is coupled to a system bus 106 and can intercouple master and slave devices included in the processor-based system 98. As is well known, the CPU(s) 100 communicates with these other devices by exchanging address, control, and data information over the system bus 106. For example, the CPU(s) 100 can communicate bus transaction requests to a memory system 108, which provides memory units 110(0)-110(N).

Other master and slave devices can be connected to the system bus 106. As illustrated in FIG. 6, these devices can include a memory controller 112, one or more input devices 114, one or more output devices 116, one or more network interface devices 118, and one or more display controllers 120, as examples. The input device(s) 114 can include any type of input device, including but not limited to input keys, switches, voice processors, etc. The output device(s) 116 can include any type of output device, including but not limited to audio, video, other visual indicators, etc. The network interface device(s) 118 can be any devices configured to allow exchange of data to and from a network 122. The network 122 can be any type of network, including but not limited to a wired or wireless network, a private or public network, a local area network (LAN), a wide local area network (WLAN), and the Internet. The network interface device(s) 118 can be configured to support any type of communications protocol desired.

The CPU(s) 100 may also be configured to access the display controller(s) 120 over the system bus 106 to control information sent to one or more displays 124. The display controller(s) 120 sends information to the display(s) 124 to be displayed via one or more video processors 126, which process the information to be displayed into a format suitable for the display(s) 124. The display(s) 124 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A dynamic load balancing circuit, comprising:
a control unit communicatively coupled to a first cluster of one or more hardware threads and a second cluster of one or more hardware threads of a clustered processor core;
the control unit configured to:
determine whether a suboptimal load condition exists between the first cluster and the second cluster; and
responsive to determining that a suboptimal load condition exists:
transfer a content of one or more private registers of a first hardware thread of the one or more hardware threads of the first cluster to one or more private registers of a second hardware thread of the one or more hardware threads of the second cluster via shared hardware resources communicatively coupled to the first hardware thread and the second hardware thread; and swap a first identifier associated with the first hardware thread with a second identifier associated with the second hardware thread via the shared hardware resources.

2. The dynamic load balancing circuit of claim 1, wherein the shared hardware resources comprise an execution unit or a cache, or combinations thereof.

3. The dynamic load balancing circuit of claim 1, wherein the control unit is configured to determine whether the suboptimal load condition exists between the first cluster and the second cluster by detecting an underutilization of the second cluster.

4. The dynamic load balancing circuit of claim 1, wherein the control unit is configured to determine whether the suboptimal load condition exists between the first cluster and the second cluster by detecting a potential reduction in energy consumption of the clustered processor core.

5. The dynamic load balancing circuit of claim 1, wherein the control unit is configured to determine whether the suboptimal load condition exists between the first cluster and the second cluster based on load data indicating one or more of processor utilization, utilization of shared cluster resources, a number of executing processes, or power consumption by the first cluster and the second cluster.

6. The dynamic load balancing circuit of claim 1, wherein the control unit is configured to transfer the content of the one or more private registers of the first hardware thread of the one or more hardware threads of the first cluster to the one or more private registers of the second hardware thread of the one or more hardware threads of the second cluster by transferring a content of one or more General Purpose Registers (GPRs) or a content of one or more control registers, or combinations thereof.

7. The dynamic load balancing circuit of claim 6, wherein:
the one or more control registers comprise the first identifier associated with the first hardware thread and the second identifier associated with the second hardware thread;
the first identifier associated with the first hardware thread maps a first software thread to the first hardware thread; and
the second identifier associated with the second hardware thread maps a second software thread to the second hardware thread.

8. The dynamic load balancing circuit of claim 1 integrated into an integrated circuit.

9. The dynamic load balancing circuit of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

10. A dynamic load balancing circuit for providing dynamic load balancing of hardware threads in clustered processor cores, comprising:
a means for determining whether a suboptimal load condition exists between a first cluster of one or more hardware threads and a second cluster of one or more hardware threads of a clustered processor core;

a means for, responsive to determining that a suboptimal load condition exists, transferring a content of one or more private registers of a first hardware thread of the one or more hardware threads of the first cluster to one or more private registers of a second hardware thread of the one or more hardware threads of the second cluster via shared hardware resources communicatively coupled to the first hardware thread and the second hardware thread; and a means for, responsive to determining that a suboptimal load condition exists, swapping a first identifier associated with the first hardware thread with a second identifier associated with the second hardware thread via the shared hardware resources.

11. A method for providing dynamic load balancing of hardware threads in clustered processor cores, comprising:
determining whether a suboptimal load condition exists between a first cluster of one or more hardware threads and a second cluster of one or more hardware threads of a clustered processor core; and
responsive to determining that a suboptimal load condition exists:
transferring a content of one or more private registers of a first hardware thread of the one or more hardware threads of the first cluster to one or more private registers of a second hardware thread of the one or more hardware threads of the second cluster via shared hardware resources communicatively coupled to the first hardware thread and the second hardware thread; and
swapping a first identifier associated with the first hardware thread with a second identifier associated with the second hardware thread via the shared hardware resources.

12. The method of claim 11, wherein the shared hardware resources comprise an execution unit or a cache, or combinations thereof.

13. The method of claim 11, wherein determining whether the suboptimal load condition exists between the first cluster and the second cluster comprises detecting an underutilization of the second cluster.

14. The method of claim 11, wherein determining whether the suboptimal load condition exists between the first cluster and the second cluster comprises detecting a potential reduction in energy consumption of the clustered processor core.

15. The method of claim 11, wherein determining whether the suboptimal load condition exists between the first cluster and the second cluster is based on load data indicating one or more of processor utilization, utilization of shared cluster resources, a number of executing processes, or power consumption by the first cluster and the second cluster.

16. The method of claim 11, wherein transferring the content of the one or more private registers of the first hardware thread of the one or more hardware threads of the first cluster to the one or more private registers of the second hardware thread of the one or more hardware threads of the second cluster comprises transferring a content of one or more General Purpose Registers (GPRs) or a content of one or more control registers, or combinations thereof.

17. The method of claim 16, wherein:
the one or more control registers comprise the first identifier associated with the first hardware thread and the second identifier associated with the second hardware thread;
the first identifier associated with the first hardware thread maps a first software thread to the first hardware thread; and the second identifier associated with the second hardware thread maps a second software thread to the second hardware thread.

18. A non-transitory computer-readable medium having stored thereon computer executable instructions which, when executed, cause a processor to:
    determine whether a suboptimal load condition exists between a first cluster of one or more hardware threads and a second cluster of one or more hardware threads of a clustered processor core; and
    responsive to determining that a suboptimal load condition exists:
        transfer a content of one or more private registers of a first hardware thread of the one or more hardware threads of the first cluster to one or more private registers of a second hardware thread of the one or more hardware threads of the second cluster via shared hardware resources communicatively coupled to the first hardware thread and the second hardware thread; and
        swap a first identifier associated with the first hardware thread with a second identifier associated with the second hardware thread via the shared hardware resources.

19. The non-transitory computer-readable medium of claim 18 having stored thereon computer-executable instructions to cause the processor to:
    transfer the content of the one or more private registers of the first hardware thread of the one or more hardware threads of the first cluster to the one or more private registers of the second hardware thread of the one or more hardware threads of the second cluster via an execution unit or a cache, or combinations thereof; and
    swap the first identifier associated with the first hardware thread with the second identifier associated with the second hardware thread via the execution unit or the cache, or the combinations thereof.

20. The non-transitory computer-readable medium of claim 18 having stored thereon computer-executable instructions to cause the processor to determine whether the suboptimal load condition exists between the first cluster and the second cluster by detecting an underutilization of the second cluster.

21. The non-transitory computer-readable medium of claim 18 having stored thereon computer-executable instructions to cause the processor to determine whether the suboptimal load condition exists between the first cluster and the second cluster by detecting a potential reduction in energy consumption of the clustered processor core.

22. The non-transitory computer-readable medium of claim 18 having stored thereon computer-executable instructions to cause the processor to determine whether the suboptimal load condition exists between the first cluster and the second cluster based on load data indicating one or more of processor utilization, utilization of shared cluster resources, a number of executing processes, or power consumption by the first cluster and the second cluster.

23. The non-transitory computer-readable medium of claim 18 having stored thereon computer-executable instructions to cause the processor to transfer the content of the one or more private registers of the first hardware thread of the one or more hardware threads of the first cluster to the one or more private registers of the second hardware thread of the one or more hardware threads of the second cluster by transferring a content of one or more General Purpose Registers (GPRs) or a content of one or more control registers, or combinations thereof.

24. The non-transitory computer-readable medium of claim 23 having stored thereon computer-executable instructions to cause the processor to transfer the content of the one or more control registers comprising the first identifier associated with the first hardware thread and the second identifier associated with the second hardware thread;
    wherein:
        the first identifier associated with the first hardware thread maps a first software thread to the first hardware thread; and
        the second identifier associated with the second hardware thread maps a second software thread to the second hardware thread.

\* \* \* \* \*